April 19, 1938.　　　M. POIRIER　　　2,114,937
MOTOR VEHICLE WHEEL SUSPENSION
Filed Jan. 14, 1937　　　4 Sheets-Sheet 1
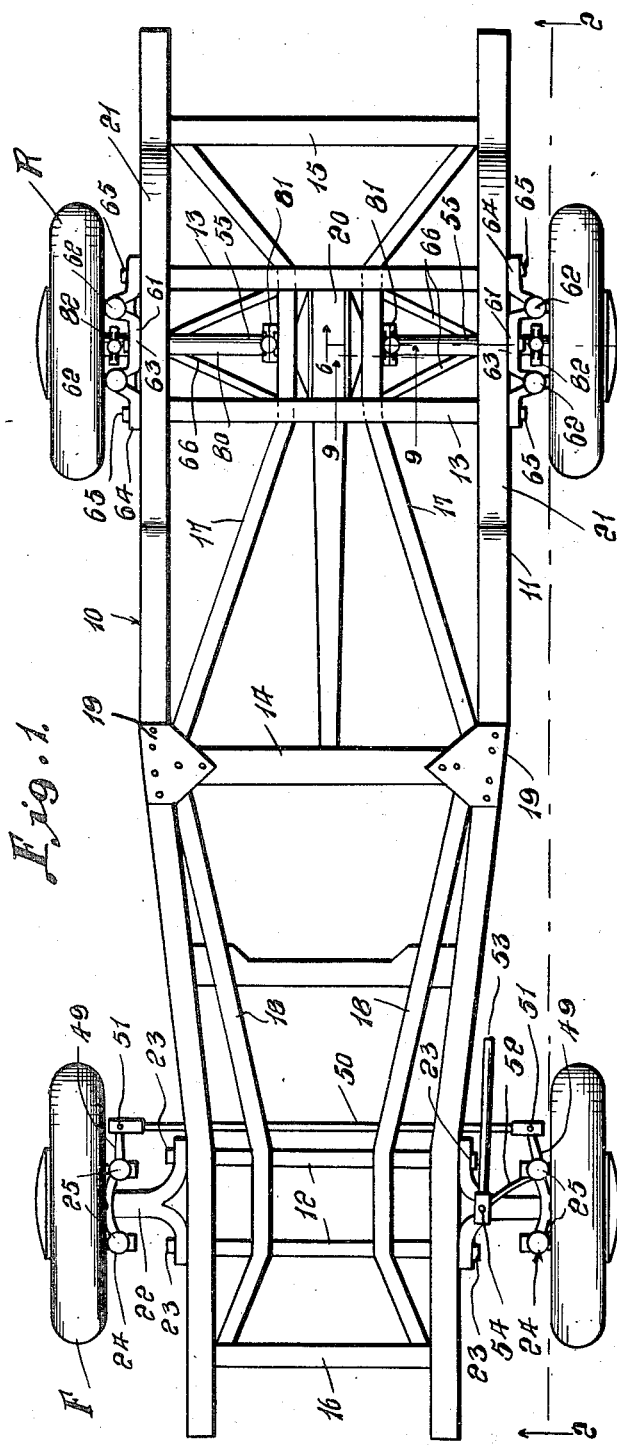
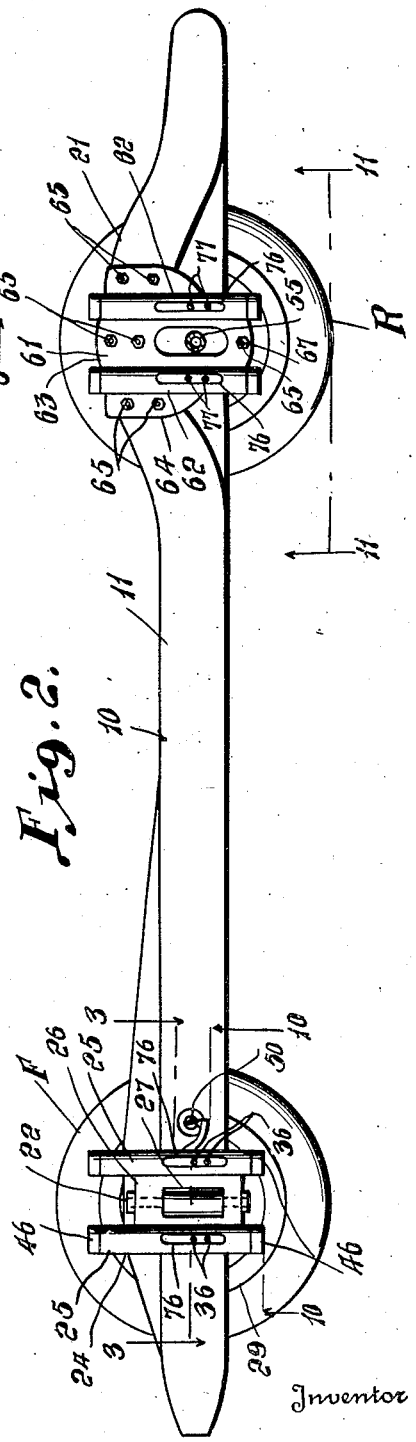
Inventor
Maurice Poirier
By L. F. Randolph
Attorney April 19, 1938.  M. POIRIER  2,114,937
MOTOR VEHICLE WHEEL SUSPENSION
Filed Jan. 14, 1937  4 Sheets-Sheet 2
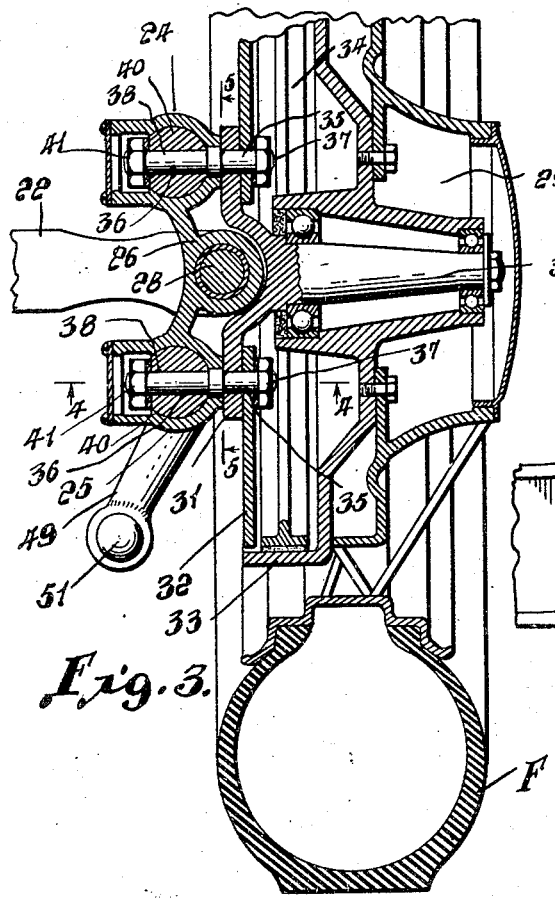
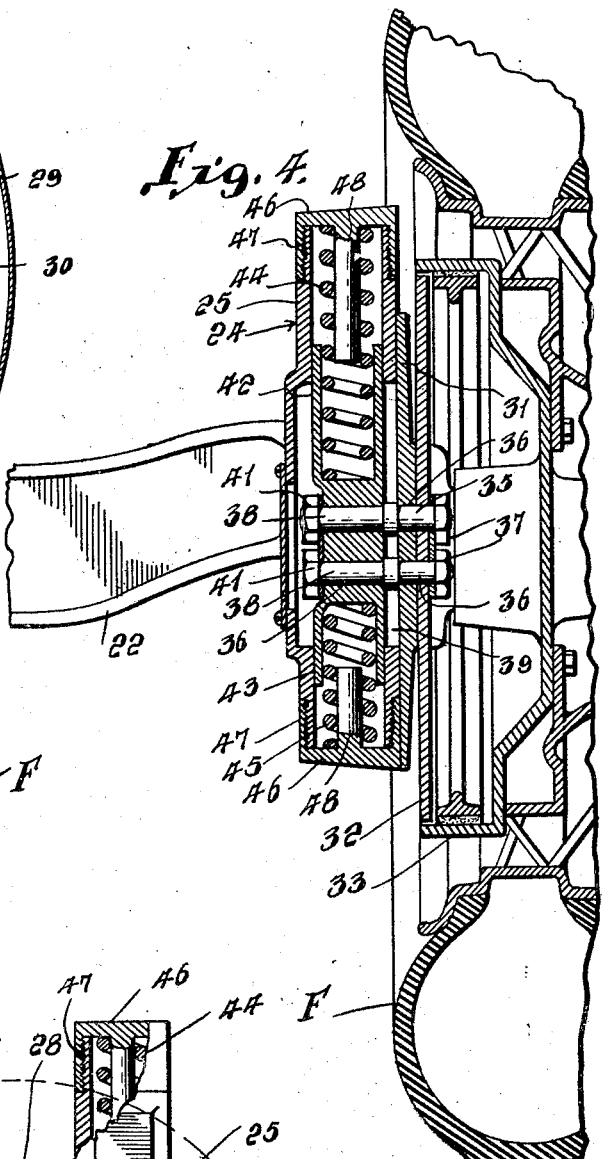
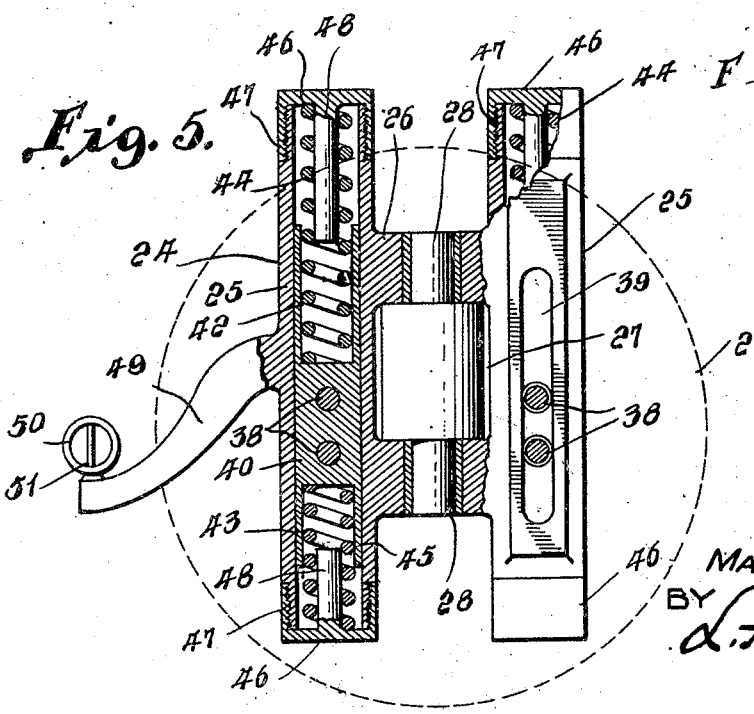
INVENTOR
MAURICE POIRIER
BY
ATTORNEY April 19, 1938. M. POIRIER 2,114,937
MOTOR VEHICLE WHEEL SUSPENSION
Filed Jan. 14, 1937 4 Sheets-Sheet 3
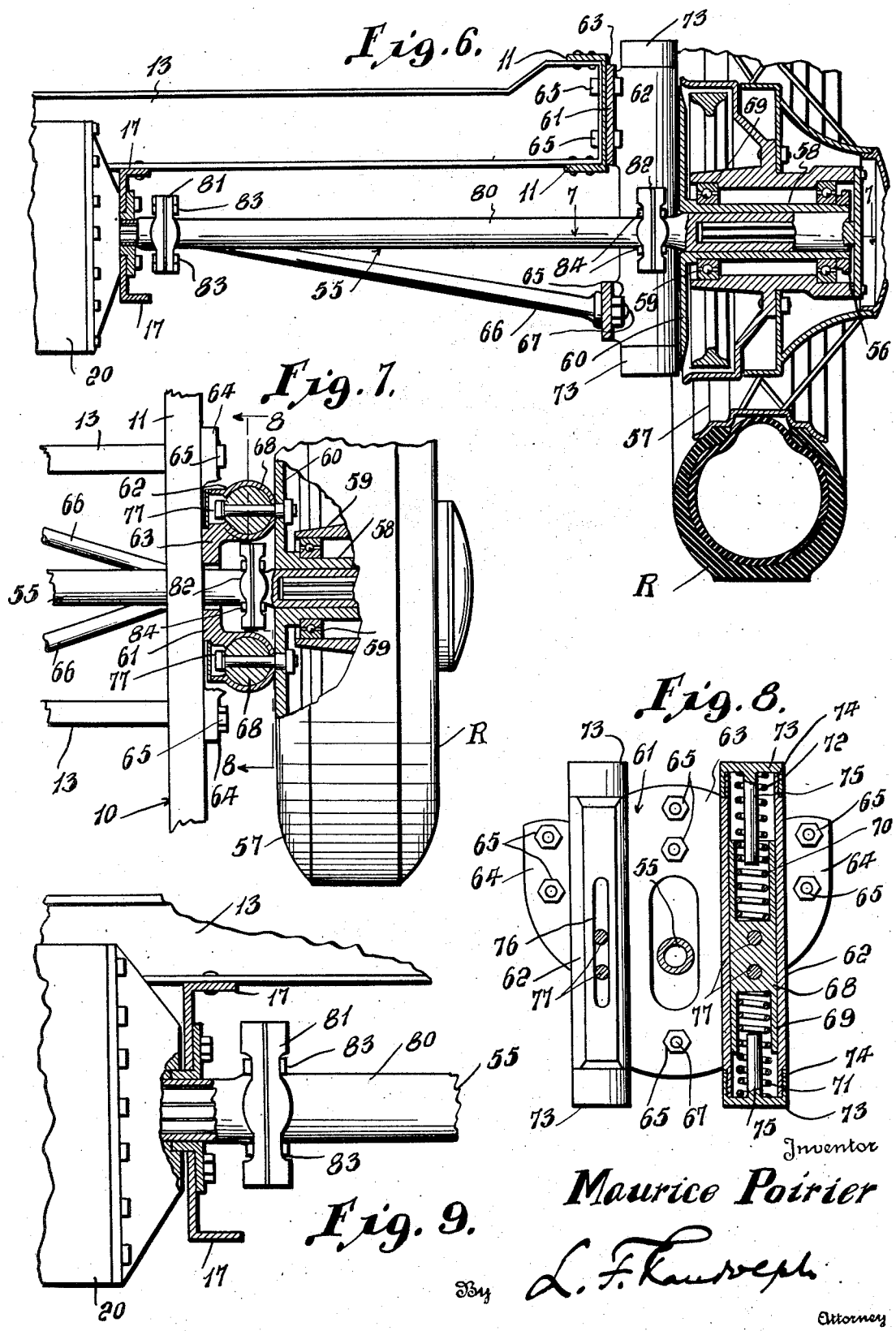
Inventor
Maurice Poirier
By L. F. Randolph
Attorney April 19, 1938.  M. POIRIER  2,114,937
MOTOR VEHICLE WHEEL SUSPENSION
Filed Jan. 14, 1937  4 Sheets-Sheet 4

Inventor
Maurice Poirier
By L. F. Randolph
Attorney

Patented Apr. 19, 1938

2,114,937

UNITED STATES PATENT OFFICE 2,114,937

MOTOR VEHICLE WHEEL SUSPENSION

Maurice Poirier, Burbank, Calif.

Application January 14, 1937, Serial No. 120,570

9 Claims. (Cl. 280—96.2)

This invention relates to a suspension primarily for the wheels of motor vehicles.

It is particularly aimed to provide a novel means of independent suspension for each of the wheels to maintain the wheels in alignment with the frame of the vehicle, to absorb road shocks and to divide the weight equally between the right and left wheels, the independent suspensions or wheel units being attachable to the frame or chassis without the use of a conventional axle, housing, leaf springs, shackles or the equivalent.

Another object is to provide an exceedingly sturdy and stable suspension which will support the chassis or frame upon the wheels, reduce the unsprung weight to the weight of the wheel itself, permit complete freedom of the wheels with the least disturbance of the unsprung weight of the vehicle, absorb the road shocks imparted to the wheels without disturbing the center of gravity, relative to right and left horizontal shiftings at all speeds, and without the use of auxiliary shock absorbers or snubbers.

Various additional objects and advantages will in part be pointed out and in part become apparent from a consideration of the description following taken in connection with accompanying drawings illustrating one operative embodiment by way of example.

In said drawings:—

Figure 1 is a plan of a vehicle frame or chassis embodying my improvements;

Figure 2 is a view primarily in side elevation taken on the plane of line 2—2 of Figure 1;

Figure 3 is a horizontal sectional view taken on the line 3—3 of Figure 2;

Figure 4 is a vertical sectional view taken on the plane of line 4—4 of Figure 3;

Figure 5 is a vertical sectional view taken on the plane of line 5—5 of Figure 3;

Figure 6 is a vertical sectional view taken on the line 6—6 of Figure 1;

Figure 7 is a longitudinal sectional view taken on the line 7—7 of Figure 6;

Figure 8 is a vertical sectional view taken on the plane of line 8—8 of Figure 7;

Figure 9 is a detail section taken on the line 9—9 of Figure 1;

Figure 10:
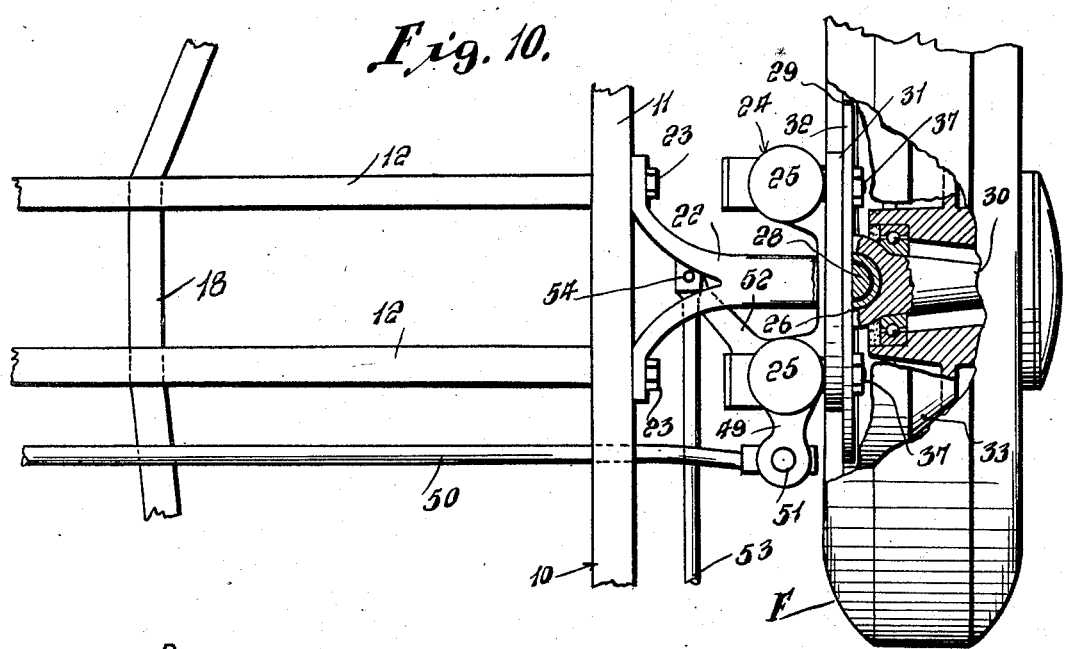
Figure 10 is a fragmentary bottom view taken on the line 10—10 of Figure 2.
Figure 11:
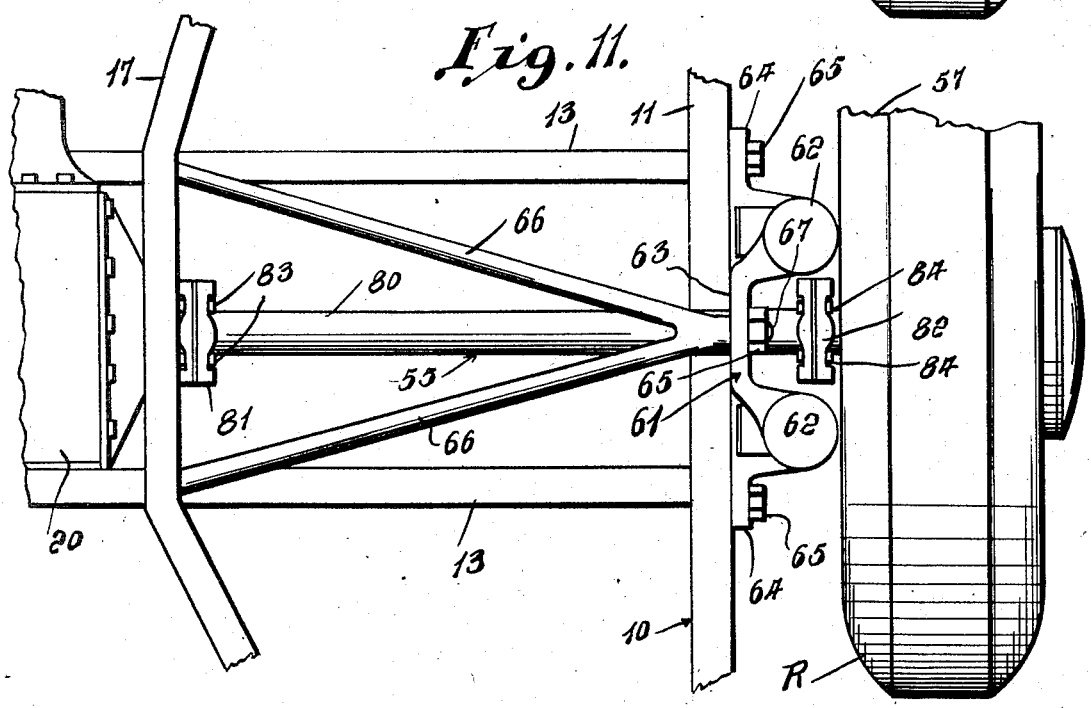
Figure 11 is a fragmentary bottom view taken on the line 11—11 of Figure 2.

In carrying out the invention, a suitable frame or chassis is employed as at 10 fabricated from various metallic beams or the equivalent. It may consist of side beams 11 joined by various cross beams as at 12, 13, 14, 15, and 16. Longitudinally deflected beams 17, reversely arranged, are connected to the beams 11, 13, 14, and 15 while substantially similar deflected beams 18 are reversely arranged and connected to beams 12, 14, 16, and 11. Beams 17, 18, and 14 meet centrally of the chassis and tie plates 19 are preferably used at such locations to connect them together and to the side beams 10. The differential gearing and its housing as generally shown at 20 is supported and located between the cross beams 13 and portions of the beams 17. The side beams 11 adjacent the rear are preferably upwardly arched as at 21.

In lieu of a front axle, suitably shaped brackets 22 are bolted as at 23 to the side beams 11 and which bolts are preferably the same bolts which connect the cross beams 12 to such side beams. Front wheel units generally designated F are independently mounted by means of said brackets or supports 22.

Such units F comprise vertically disposed frames 24 generally of H-shape as best shown in Figure 5. Such frames comprise parallel vertical cylinders 25 connected by integral webs 26 which are spaced apart to provide openings 27. The outer ends of the brackets 22 are located in the openings 27 and the frames 24 are pivotally connected to the brackets 22 by means of king-pins 28, journaled in the webs 26 as shown and rigidly but removably carried by the said ends of the brackets 22. The king-pins 28 thus provide vertical axes about which the front wheels 29 turn. Said wheels 29 are journaled on spindles 30, being removably attached in the conventional way, the spindles at the inner ends having flanges 31 to which disks or plates 32 are attached and associated with which are the brake drums 33 of the wheels 29, the drums having conventional braking means 34 therein as shown. The flanges 31 and disks 32 are detachably connected together by portions 35 of bolts 36, and co-acting nuts 37. The bolts 36 are preferably used in vertically arranged pairs as shown in Figure 5 and the remaining portions 38 of such bolts 36 pass through vertical elongated slots 39 in the cylinders 25 and thence are removably attached to piston-like vertical slides 40, disposed within the cylinders 25, nuts 41 being detachably screw threaded to the portions 38.

Said piston-like slides 40 have upper and lower sleeves 42 and 43 integral therewith and mounting expansive coil springs 44 and 45 respectively. Said cylinders 25 at opposite ends are closed by means of caps 46 screw threaded thereto as at 47 and having inwardly extending studs 48 thereon surrounded by the adjacent springs 44 and 45, respectively. Such a construction adapts itself to the use of shims or the like to take up wear or inequality. It will be observed that the upper springs 44 are much longer than the lower springs 45 since the upper springs serve as the suspension springs and the lower springs serve as the shock absorbing springs and the arrangement also prevents the rising of the chassis or frame and body of the vehicle on the side of the smaller radius when turns are made. Such type of suspension also insures that the weight is equally divided between the two wheels, because the weight shifting has always a downward travel when turns are made at high speed. The outside wheel travels upward and the weight of the vehicle downward, automatically dividing the weight equally with the inside wheel.

It will be realized that the wheels 29 are connected by the bolts 36 to the piston-like slides 40 cushioned above and below and that the wheels follow the movements of the frames 24 on the king-pins 28.

Arms 49 extend from the frames 24 and have a tie rod 50 pivotally connected thereto as at 51. In addition, an arm 52 extends from one of the frames 24 and has steering means 53 operatively connected thereto as at 54, it being understood that the steering means 53 is conventional.

Reverting to the dfferential 20 it rotates shafts 55 on opposite sides thereof secured detachably as at 56 at the hubs of rear wheels conventionally shown at 57, such wheels having thick hub members 58 about which the wheels 57 rotate, aided by antifriction bearing devices 59. Flanges or plates 60 extend from the hub member 58 at a right angle thereto.

Carrying out the same principle of suspension as employed in connection with the front wheels, vertical frames 61 are used in connection with the rear wheels. Such frames consist of vertical cylinders 62 connected by an integral web 63 and ears 64. The web 63 and ears 64 are rigidly but detachably connected to the outer surfaces of the side beams 11 of the chassis as by means of detachable bolts 65. The frames are braced or rigidified by means of bars or wishbone members 66 rigidly connected to the chassis in any suitable manner and having reduced ends 67 extending through openings in the webs 63 and having nuts 65 screw threaded thereto.

Vertically slidable in the cylinders 62 are piston-like slides 68 having tubular or cup-like extensions 69 and 70 at the bottom and top thereof, respectively in which coil expansion springs 71 and 72 are removably disposed. Caps 73 are detachably screw threaded at 74 over the ends of the cylinders 62 and the caps have inwardly extending stems or studs 75 positioning the springs. The cylinders 62 have vertical elongated slots 76 therein. The hub member 58 at the flanges 60 is connected to the piston-like slides 68 by means of detachable bolts 77 which pass through the slots 76.

It will be noted that the upper springs 72 are longer than the lower springs 71 and the parts otherwise proportioned to accord with the corresponding parts of the frames, etc. to mount the front wheels.

The shafts 55 preferably have detachable sections 80 therein connected to the remainder at 81 and 82 by detachable universal joints, respectively adjacent the differential 20 and the wheel. As a result, the wheels may be quickly removed for repairs and the differential shafts may be quickly removed for repairs, being merely a matter of removing the bolts 83 and 84 which connect the differential parts together.

Various changes may be resorted to provided they fall within the spirit and scope of the invention.

I claim as my invention:—

1. A vehicle having a chassis, initially separate frames attached to the sides of the chassis, said frames having vertical cylinders, separate slides operable within the cylinders, cushioning means for the slides, and independent means extending substantially parallel to the axis of rotation connecting the wheels to the slides and a web connecting the cylinders provided with a slot to accommodate a wheel-operating part.

2. A vehicle having a chassis, initially separate frames attached to the sides of the chassis, said frames having vertical cylinders, separate slides operable within the cylinders, cushioning means for the slides, independent means extending substantially parallel to the axis of rotation connecting the wheels to the slides, a web connecting the cylinders provided with a slot to accommodate a wheel-operating part, said cushioning means comprising springs above and below the slides, the upper springs being stronger than the lower springs for the purpose specified.

3. A vehicle having a chassis, initially separate frames attached to the sides of the chassis, said frames having vertical cylinders, separate slides operable within the cylinders, cushioning means for the slides, independent means extending substantially parallel to the axis of rotation connecting the wheels to the slides, a web connecting the cylinders provided with a slot to accommodate a wheel-operating part, said cushioning means comprising springs above and below the slides, the upper springs being stronger than the lower springs for the purpose specified, caps closing the ends of the cylinders to maintain the springs therein, said slides having cups on opposite ends in which the springs are received.

4. A vehicle having a chassis, an initially separate frame attached to the side of the chassis, said frame having vertical cylinders, separate slides operable within the cylinders, cushioning means for the slides, independent means extending substantially parallel to the axis of rotation connecting the wheel to the slides, a bracket, a kingbolt connecting the bracket and frames, the bracket serving to attach the adjacent frames to the chassis.

5. A vehicle having a chassis, an initially separate frame attached to the side of the chassis, said frame having vertical cylinders, separate slides operable within the cylinders, cushioning means for the slides, independent means extending substantially parallel to the axis of rotation connecting the wheel to the slides, a bracket, a kingbolt connecting the bracket and frame, the bracket serving to attach the frame to the chassis, a tie rod connection for the frame, and steering means for the said frame.

6. A vehicle wheel support comprising a frame adapted for attachment to the chassis of the vehicle, said frame having cylinders, separate slides movable in the cylinders, independent means extending substantially parallel to the axis of rotation to attach a wheel to the slides, said cylinders having slots through which parts of the said means pass, said means including a device to mount a wheel, said device being positioned to close said slots.

7. A vehicle wheel support comprising a frame adapted for attachment to the chassis of the vehicle, said frame having cylinders, separate slides movable in the cylinders, independent means extending substantially parallel to the axis of rotation to attach a wheel to the slides, said cylinders having slots through which the last mentioned means pass, cushioning means for the slides in the cylinders on opposite sides thereof, and a web connecting the cylinders provided with a slot to accommodate a wheel-operating part.

8. A vehicle wheel support comprising a frame adapted for attachment to the chassis of the vehicle, said frame having cylinders, separate slides movable in the cylinders, independent means extending substantially parallel to the axis of rotation to attach a wheel to the slides, said cylinders having slots through which the last mentioned means pass, cushioning means for the slides in the cylinders on opposite sides thereof, the frame having a slot between the cylinders, and a bracket extending into the slot and a king-pin connecting the frame and bracket.

9. A vehicle wheel support comprising a frame adapted for attachment to the chassis of the vehicle, said frame having cylinders, slides movable in the cylinders, means to attach a wheel to the slides, said cylinders having slots through which the last mentioned means pass, cushioning means for the slides in the cylinders on opposite sides thereof, a web between the cylinders provided with an elongated slot for passage of a differential shaft therethrough.

MAURICE POIRIER.